United States Patent [19]

Kaelsch

[11] Patent Number: 5,251,855
[45] Date of Patent: Oct. 12, 1993

[54] SPACECRAFT PROPULSION SYSTEM THRUSTER FIRING SYSTEM

[75] Inventor: Ingo Kaelsch, Leiden, Netherlands

[73] Assignee: Agence Spatiale Europeenne, France

[21] Appl. No.: 995,520

[22] Filed: Dec. 22, 1992

Related U.S. Application Data

[63] Continuation of Ser. No. 697,400, May 9, 1991, abandoned.

[30] Foreign Application Priority Data

May 9, 1990 [FR] France ................................ 90 05769

[51] Int. Cl.$^5$ ........................... B64G 1/26; B64G 1/40
[52] U.S. Cl. ..................................... 244/172; 244/169
[58] Field of Search ................ 244/164, 169, 158, 172

[56] References Cited

U.S. PATENT DOCUMENTS

| | | |
|---|---|---|
| 3,231,223 | 1/1966 | Upper . |
| 3,352,297 | 10/1970 | Maes .................................. 244/169 |
| 3,862,732 | 1/1975 | Wyatt et al. . |
| 4,630,790 | 12/1986 | Williams, Jr. ...................... 244/169 |
| 4,911,385 | 3/1990 | Agrawal ............................ 244/164 |
| 5,020,746 | 6/1991 | Anzel ................................. 244/169 |
| 5,064,152 | 11/1991 | Maute ................................. 244/169 |

FOREIGN PATENT DOCUMENTS 2365154 4/1978 France .
2056392 3/1981 United Kingdom .

OTHER PUBLICATIONS

Ninomiya, et al., "Attitude and Orbit Control System of the Japanese Halley's Comet Explorers 'SAKIGAKE' and 'SUISEI'", NEC—Research & Development, No. 83, Oct. 1986, pp. 82–91.

*Primary Examiner*—Joseph F. Peters, Jr.
*Assistant Examiner*—Virna Lissi Ansley
*Attorney, Agent, or Firm*—Andrus, Sceales, Starke & Sawall

[57] ABSTRACT

Thrusters in a propulsion system of a spacecraft spin stabilized by rotation about a spin axis are fired to increase the orbital velocity of the spacecraft in a maneuver direction along the orbital velocity vector. The propulsion system comprises a pair of thrusters juxtaposed on a common support at the periphery of the spacecraft. The thrusters have thrust axes perpendicular to the spin axis and offset relative to a transverse axis of the spacecraft by equal and opposite offset angles. Each thruster is fired separately and alternately when its thrust axis is substantially parallel to the maneuver direction while the spacecraft is rotating about its spin axis.

1 Claim, 1 Drawing Sheet

SPACECRAFT PROPULSION SYSTEM THRUSTER FIRING SYSTEM

This application is a continuation of U.S. patent application Ser. No. 07/697,400 filed May 9, 1991, now abandoned.

BACKGROUND OF THE INVENTION

1. Field of the Invention

The invention concerns propulsion systems of a spacecraft spin stabilized by rotation about its spin axis, such as a satellite orbiting the earth.

The invention concerns a method of firing the thrusters of a spacecraft propulsion system in order to increase the orbital revolution velocity of the satellite while it is rotating about its spin axis.

2. Description of the Prior Art

A propulsion system may include eight control thrusters for maneuvering the spacecraft by applying a reaction force to it in an appropriate plane in order to adjust its orbital position, its trajectory or its attitude.

Four thrusters are conventionally disposed separately at the periphery of the spacecraft, usually on its circumference, in a plane perpendicular to the spin axis of the spacecraft in order to correct its spin rate and its orbital velocity. The four thrusters are arranged in a known "rectangular" configuration with each thruster at one corner of a rectangle to form two pairs of radially opposed thrusters.

In a known propulsion system arrangement as shown in FIG. 1, the orientations of the thrusters of a pair of thrusters are offset relative to a radial orientation and the thrusters are fired simultaneously for a fraction of the period of revolution of the spacecraft over a number of revolutions in order to increase the orbital velocity of the spacecraft. The thrust axes 40 of the thrusters 30 of a pair of thrusters are so arranged that, during said fraction of the revolution period of the spacecraft 10, the thrust axes of the thrusters of a pair of thrusters are parallel to each other and to the direction $\bar{D}$ of the maneuver along the orbital velocity vector. The thrusters of a pair of thrusters are activated simultaneously to perform the maneuver, each thruster when activated individually generating an angular moment which modifies the spin rate of the spacecraft.

This propulsion system arrangement has a number of drawbacks and in particular it is found that the jet of propellant gases forming a plume at the thruster nozzles tends to contaminate the experimental equipment and in particular the optical surface of observation devices disposed at the periphery of the spacecraft. Also, the high temperatures of the gas jets have a considerable effect on the performance of the onboard instruments and on the operation of articulated booms carrying instruments and attached to the periphery of the spacecraft. Finally, the rectangular configuration of the thrusters is costly and complex in that it requires a separate propellant feed for each thruster.

It is therefore necessary to optimize the positions of the thrusters and the sequence in which they are fired so as to minimize the harmful effects of the gas jets on the onboard equipment without compromising the performance of the propulsion system in terms of its propellant consumption and its complexity.

An object of the invention is to remedy the drawbacks described above of prior art propulsion systems and in particular to provide a method of firing thrusters in a propulsion system of a spin stabilized spacecraft which minimizes the effect of thruster plume on experimental instruments attached to the exterior of the spacecraft while ensuring reduced propellant consumption during maneuvering of the spacecraft.

SUMMARY OF THE INVENTION

The invention comprises a method of firing thrusters in a propulsion system of a spacecraft spin stabilized by rotation about a spin axis to increase the orbital velocity of the spacecraft in a maneuver direction along the orbital velocity vector, the propulsion system comprising a pair of thrusters juxtaposed on a common support at the periphery of the spacecraft, the thrusters having thrust axes perpendicular to the spin axis and offset relative to a transverse axis of the spacecraft by equal and opposite offset angles, in which method each thruster is fired separately and alternately when its thrust axis is substantially parallel to the maneuver direction while the spacecraft is rotating about its spin axis.

Other characteristics and advantages of the invention will emerge more clearly from the following description of a preferred embodiment of the invention given by way of non-limiting example only with reference to the appended diagrammatic drawings.

DETAILED DESCRIPTION OF THE INVENTION

The same reference numbers denote the same parts in all the figures.

Figure 1:
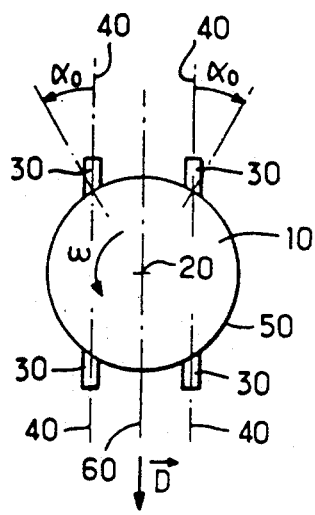
FIG. 1 is a diagram showing a spacecraft equipped with a prior art propulsion system.
Figure 2:
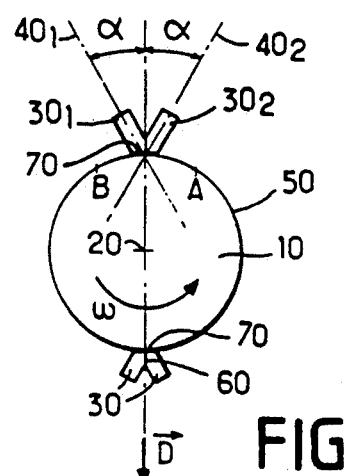
FIG. 2 is a diagram showing a spacecraft equipped with a propulsion system in accordance with the invention.

As shown in FIG. 2, the spacecraft 10 in accordance with the invention has a pair of thrusters $30_1$, $30_2$ attached to the periphery 50 of the spacecraft. The thrusters are disposed in symmetrical radial positions relative to the transverse axis 60 of the spacecraft which intersects the spin axis 20 of the spacecraft. As shown in this figure, the two thrusters are juxtaposed so that their radial positions are substantially coincident with the transverse axis 60, being attached to the spacecraft by a common support 70. In this way the thrusters of a pair of thrusters are brought together at a common point on the periphery of the spacecraft with the result that attachment points for experimental equipment can be chosen sufficiently far away from the thrusters to avoid the prior art drawbacks. The thruster propellant feed system and the electrical distribution system are also simplified. A second pair of thrusters 30 can likewise be provided at the periphery of the spacecraft in radial opposition relative to the pair of thrusters $30_1$, $30_2$. As seen in this figure, the thrust axes $40_1$, $40_2$ of the thrusters $30_1$, $30_2$ are offset by equal and opposite fixed angles $\alpha$ relative to their respective radial positions.

Figure 3:
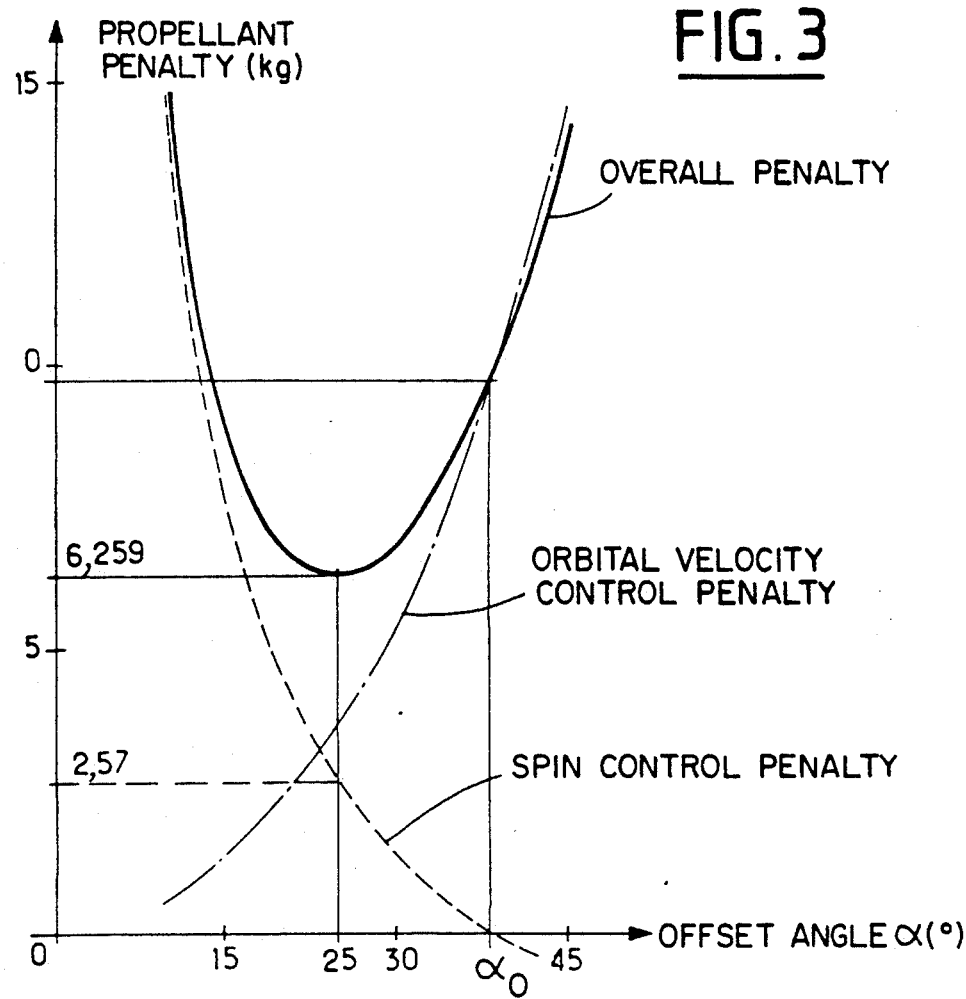
FIG. 3 shows the propellant penalty of the propulsion system shown in FIG. 2 relative to a basic configuration as previously described as a function of the thruster offset angle for various maneuvers of the spacecraft.

FIG. 3 shows the propellant penalty (additional propellant requirement) due to the layout of the propulsion system in accordance with the invention as compared with the basic "rectangular" prior art configuration described above for a maneuver to correct the spin rate of the spacecraft, a maneuver to correct the orbital velocity of the spacecraft and a combination of the two, as a function of the offset angle $\alpha$. In this figure, $\alpha_0$ represents the offset angle of the basic configuration. The propellant penalty for a spin rate correction maneuver depends only on the offset angle $\alpha$. It will be assumed that there is no such penalty for an offset angle $\alpha_0$. Note in this figure and in particular on the curve marked "Spin Control Penalty" that the propellant consumption for a maneuver of this kind decreases beyond $\alpha_0$ and is minimal for an offset angle of 90°.

The propellant penalty for a maneuver to correct the orbital velocity of the spacecraft also depends on the offset angle $\alpha$. There is no penalty for an offset angle of $\alpha = 0$, as shown by the curve marked "Orbital Velocity Control Penalty".

In a first configuration, for a maneuver to correct the orbital velocity of the spacecraft, the direction of this maneuver being indicated at $\bar{D}$ in FIG. 2, the two thrusters $30_1$, $30_2$ are fired simultaneously while the spacecraft is rotating so as to impart to the spacecraft a parallel reaction force in the same direction as the vector $\bar{D}$.

As shown in FIG. 3 and in particular on the curve marked "Overall penalty", the overall propellant penalty for the propulsion system in accordance with this configuration as compared with a basic configuration is minimal for an offset angle of 25°. The minimal penalty is approximately 6.259 kg of propellant per thruster.

In the configuration relating to the invention, for a maneuver to correct the orbital velocity of the spacecraft, the thrusters $30_1$, $30_2$ are selectively and alternatively fired when their respective thrust axis $40_1$, $40_2$ is substantially parallel to the direction $\bar{D}$ of the maneuver along the orbital velocity vector while the spacecraft 10 is rotating about its spin axis. The thruster $30_1$ is therefore fired substantially at the time when the common support 70 of the thruster pair $30_1$, $30_2$ is at the position A, in other words when the axis of symmetry 60 is at an angle $\alpha$ to the direction of the maneuver along the orbital velocity vector. The thruster $30_2$ is then fired substantially at the time when the common support 70 of the thruster pair, having rotated through an angle of $2\alpha$ relative to the spin axis 20, is at the position B. Each thruster $30_1$, $30_2$ is fired for a fraction of the period of revolution of the spacecraft when the respective thrust axes $40_1$, $40_2$ of the thrusters $30_1$, $30_2$ are parallel to the direction of the orbital velocity vector.

With this method there is no propellant penalty as compared with the basic configuration for the maneuver to correct the spacecraft orbital velocity.

In this second configuration, an offset angle can be chosen to reduce further the effects of thruster plume on the instrumentation equipment. Note that for an offset angle of $\alpha$, the configuration of the propulsion system used with the invention does not lead to any propellant penalty relative to a basic "rectangular" prior art configuration.

Of course, the invention is not limited to the embodiment described above and other variants thereof can be arrived at without departing from the scope of the invention.

There is claimed:

1. A method of firing thrusters in a propulsion system of a spacecraft spin stabilized by rotation about a spin axis to increase the orbital velocity of the spacecraft in a maneuver direction along the orbital velocity vector, the propulsion system comprising a pair of thrusters juxtaposed on a common support at the periphery of the spacecraft, the thrusters having thrust axes which lie in a plane, said plane being perpendicular to the spin axis, said thrust axes being offset relative to a transverse axis of the spacecraft by equal and opposite offset angles, in which method each thruster is fired separately and alternately when its thrust axis is substantially parallel to the maneuver direction while the spacecraft is rotating about its spin axis.

* * * * *